(12) United States Patent
Chung et al.

(10) Patent No.: US 10,088,152 B2
(45) Date of Patent: Oct. 2, 2018

(54) APPARATUSES AND METHODS FOR COMBUSTION AND MATERIAL SYNTHESIS

(71) Applicant: KING ABDULLAH UNIVERSITY OF SCIENCE AND TECHNOLOGY, Thuwal (SA)

(72) Inventors: Suk Ho Chung, Thuwal (SA); Nasir Memon, Thuwal (SA); Markous Abdo, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 29 days.

(21) Appl. No.: 15/101,563

(22) PCT Filed: Dec. 4, 2014

(86) PCT No.: PCT/IB2014/066607
§ 371 (c)(1),
(2) Date: Jun. 3, 2016

(87) PCT Pub. No.: WO2015/083124
PCT Pub. Date: Jun. 11, 2015

(65) Prior Publication Data
US 2017/0284662 A1    Oct. 5, 2017

Related U.S. Application Data

(60) Provisional application No. 61/911,572, filed on Dec. 4, 2013.

(51) Int. Cl.
C01B 33/18     (2006.01)
F23D 11/38     (2006.01)
(Continued)

(52) U.S. Cl.
CPC .......... *F23D 11/383* (2013.01); *C01B 33/183* (2013.01); *C01F 7/308* (2013.01);
(Continued)

(58) Field of Classification Search
CPC ......... F23D 11/383; F23D 14/24; F23D 14/58
(Continued)

(56) References Cited

U.S. PATENT DOCUMENTS 1,449,007 A * 3/1923 Kerrihard ................ F23D 5/00
                                                         431/117
2,836,234 A    5/1958 Sage
(Continued)

FOREIGN PATENT DOCUMENTS

EP    1889810    2/2008
GB    1460648    1/1977
(Continued)

OTHER PUBLICATIONS

EP Communication pursuant to Rules 70(2) and 70a(2) EPC in related European Application No. 14868595, dated Aug. 25, 2017.
(Continued)

*Primary Examiner* — Avinash Savani
(74) *Attorney, Agent, or Firm* — Patent Portfolio Builders, PLLC

(57) ABSTRACT

Combustion apparatuses (e.g., burners) and methods, such as those configured to encourage mixing of fluid, flame stability, and synthesis of materials (e.g., nano-particles), among other things.

20 Claims, 8 Drawing Sheets

(51) Int. Cl.
*F23D 14/24* (2006.01)
*F23D 14/58* (2006.01)
*C09C 1/54* (2006.01)
*C01G 23/07* (2006.01)
*C01F 7/30* (2006.01)
*C01F 17/00* (2006.01)
*C01G 49/02* (2006.01)
*C01G 9/02* (2006.01)
*C01G 25/02* (2006.01)

(52) U.S. Cl.
CPC ............ *C01F 17/0043* (2013.01); *C01G 9/02* (2013.01); *C01G 23/07* (2013.01); *C01G 25/02* (2013.01); *C01G 49/02* (2013.01); *C09C 1/54* (2013.01); *F23D 14/24* (2013.01); *F23D 14/58* (2013.01); *C01P 2004/64* (2013.01)

(58) Field of Classification Search
USPC .......................................................... 431/9
See application file for complete search history.

(56) References Cited

U.S. PATENT DOCUMENTS

| | | | | |
|---|---|---|---|---|
| 2,998,230 | A * | 8/1961 | Perretti | F02M 17/16 |
| | | | | 261/30 |
| 3,695,812 | A * | 10/1972 | Herron | F23D 91/02 |
| | | | | 431/90 |
| 4,447,010 | A | 5/1984 | Maeda et al. | |
| 4,491,456 | A | 1/1985 | Schlinger | |
| 4,526,322 | A * | 7/1985 | Voorheis | F23D 11/12 |
| | | | | 239/404 |
| 5,542,606 | A * | 8/1996 | Kadyrov | B05B 7/0006 |
| | | | | 239/81 |
| 5,743,723 | A | 4/1998 | Iatrides et al. | |
| 6,478,577 | B1 * | 11/2002 | Maricic | F23D 14/04 |
| | | | | 239/552 |
| 6,923,385 | B2 * | 8/2005 | Koponen | B05B 7/061 |
| | | | | 239/422 |
| 8,292,615 | B2 | 10/2012 | Spangelo et al. | |
| 2002/0086257 | A1 | 7/2002 | Primdahl | |
| 2006/0042253 | A1 | 3/2006 | Fortuna et al. | |
| 2013/0084224 | A1 | 4/2013 | Ergut | |

FOREIGN PATENT DOCUMENTS

| | | |
|---|---|---|
| JP | S6021822 | 2/1985 |
| JP | H08261413 A | 10/1996 |
| JP | 2009541588 A | 11/2009 |
| KR | 100225750 | 10/1999 |
| WO | 2007149881 A2 | 12/2007 |
| WO | 2013125972 A1 | 8/2013 |
| WO | 2015083006 A3 | 10/2015 |

OTHER PUBLICATIONS

EP Communication with Extended European Search Report in related European Application No. 14868595, dated Aug. 8, 2017.
International Search Report and Written Opinion issued in PCT/IB2014/066607, dated Mar. 27, 2015.
International Search Report and Written Opinion issued in related application No. PCT/IB2014/003111, dated Jun. 25, 2015.
Notice of Reasons for Rejection in related Japanese Patent Application No. 2016-536763, dated Jul. 30, 2018 (Cited Documents D1 and D2 were previously provided with the IDS filed Sep. 7, 2016).

* cited by examiner

APPARATUSES AND METHODS FOR COMBUSTION AND MATERIAL SYNTHESIS

CROSS-REFERENCE TO RELATED APPLICATIONS

This is a national phase application under 35 U.S.C. § 371 of International Application No. PCT/IB2014/066607, filed Dec. 4, 2014, which claims the benefit of U.S. Provisional Patent Application No. 61/911,572, filed Dec. 4, 2013, the contents of which applications are incorporated by reference in their entirety.

BACKGROUND

1. Field of the Invention

The present invention relates generally to combustion apparatuses (e.g., burners) and methods, and more particularly, but not by way of limitation, to combustion apparatuses and methods configured to encourage mixing of fluid, flame stability, and synthesis of materials (e.g., nanoparticles), among other things.

2. Description of Related Art

Examples of combustion apparatuses and methods are disclosed, for example, in Korean Reg. No. 1002257500000, European Patent No. 1889810, and U.S. Pat. No. 2,836,234.

SUMMARY

This disclosure includes embodiments of combustion apparatuses (e.g., burners) and methods configured, for example, to encourage mixing of fluid, flame stability, and synthesis of materials (e.g., nanoparticles), among other things. The disclosed combustion apparatuses and methods can—in part by utilizing the Coanda effect—increase flame stability, increase turbulent fluid flow through the apparatuses, increase blow-off velocity, decrease flame height, and increase mixing of fluid that exits the apparatuses. Such effects can lead to an increased vaporization of fluid (e.g., precursor, fuel, etc.) exiting the apparatuses and an increase in material synthesis. Further, the present apparatuses and methods permit variation of parameters, such as temperature, fluid type and quantity (e.g., fuel-to-oxidizer ratios), and fluid loading rates (e.g., precursor loading rate, fuel loading rate, oxidizer loading rate, etc.), which can also increase vaporization, increase efficiency in production of materials (e.g., nanoparticles), enable production of various types of materials (e.g., nanoparticles), and increase uniformity of the produced materials (e.g., nanoparticles).

Some embodiments of the present combustion apparatuses comprise a base; a center member having a longitudinal axis and comprising: a body coupled to the base, where at least a portion of the body is substantially cylindrical; a tip integral with the body, where at least a portion of the tip is substantially hemispherical; and a bore concentric with the longitudinal axis of the center member, the bore extending through the body and the tip; and an outer member comprising: a body coupled to the base; a tip integral with the body, where at least a portion of the tip of the center member is farther from the base than the tip of the outer member; and a bore concentric with the longitudinal axis of the center member; where the outer member is positioned such that a channel is defined between the outer member and the center member; where the apparatus is configured to: permit fluid to move through the bore of the center member and out of the tip of the center member; and permit fluid to move through the channel and out of the tip of the outer member. In some embodiments, the bore of the center member comprises a diameter of 2 to 10 millimeters. In some embodiments, the bore of the center member comprises a diameter of 6 millimeters. In some embodiments, the bore of the outer member comprises a diameter of 30 to 50 millimeters. In some embodiments, at least a portion of the bore of the outer member comprises a diameter of 38 millimeters. In some embodiments, the outer member comprises a diameter of 30 to 100 millimeters. In some embodiments, the center member comprises a diameter of 30 to 45 millimeters. In some embodiments, the tip of the center member has a first end and a second end, and the second end of the tip is substantially concave. In some embodiments, the apparatuses further comprise a spray injector disposed in the bore of the center member such that when fluid moves through the bore of the center member, the spray injector assists in atomizing the fluid. In some embodiments, the outer member is configured such that fluid can be introduced into the channel substantially perpendicular to the channel. In some embodiments, the apparatuses further comprise a swirling vane disposed in the bore of the center member such that fluid moving through the bore of the center member is disturbed. In some embodiments, the apparatuses further comprise a swirling vane disposed in the channel such that fluid moving through the channel is disturbed. In some embodiments, the center member is adjustable with respect to the outer member such that at least a portion of the channel can change in width. In some embodiments, the outer member is adjustable with respect to the center member such that at least a portion of the channel can change in width.

Some embodiments of the present methods comprise introducing a first fluid into a bore of a center member that has a longitudinal axis, the center member comprising: a body coupled to a base, where at least a portion of the body is substantially cylindrical; and a tip integral with the body, where at least a portion of the tip is substantially hemispherical; where the bore of the center member is concentric with the longitudinal axis of the center member and extends through the body and the tip; introducing a second fluid into a channel defined by the center member and an outer member, the outer member comprising: a body coupled to the base; and a tip integral with the body, where at least a portion of the tip of the center member is farther from the base than the tip of the outer member; permitting the second fluid to flow over the tip of the center member and to mix with the first fluid; and igniting the mixture of the first fluid and the second fluid. In some embodiments, the first fluid is a precursor and the second fluid is a mixture of fuel and oxidizer. In some embodiments, the precursor comprises a metal nitrate dissolved in solvent. In some embodiments, the first fluid is fuel and the second fluid is oxidizer. In some embodiments, a spray injector is disposed in the bore of the center member, and the methods further comprise atomizing the first fluid. In some embodiments, the first fluid is a liquid. In some embodiments, the methods further comprise introducing dispersion gas into the bore of the center member such that the second fluid is atomized. In some embodiments, the methods further comprise introducing the second fluid into the channel substantially perpendicular to the channel. In some embodiments, the methods comprise adjusting the center member with respect to the outer member such that at least a portion of the channel between the tip of the outer member and the tip of the center member changes in width. In some embodiments, the methods comprise adjusting the outer member with respect to the center member such that at least a portion of the channel between the tip of the outer member and the tip of the center member changes in width.

The term "coupled" is defined as connected, although not necessarily directly, and not necessarily mechanically. Two items are "couplable" if they can be coupled to each other. Unless the context explicitly requires otherwise, items that are couplable are also decouplable, and vice-versa. One non-limiting way in which a first structure is couplable to a second structure is for the first structure to be configured to be coupled (or configured to be couplable) to the second structure. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, an apparatus, or a component of an apparatus that "comprises," "has," "includes" or "contains" one or more elements or features possesses those one or more elements or features, but is not limited to possessing only those elements or features. Likewise, a method that "comprises," "has," "includes" or "contains" one or more steps possesses those one or more steps, but is not limited to possessing only those one or more steps. Additionally, terms such as "first" and "second" are used only to differentiate structures or features, and not to limit the different structures or features to a particular order.

Any embodiment of any of the present combustion apparatuses and methods can consist of or consist essentially of—rather than comprise/include/contain/have—any of the described elements and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. At least some of the figures depict graphical symbols or representations that will be understood by those of ordinary skill in the art.

DESCRIPTION OF ILLUSTRATIVE EMBODIMENTS

Figure 1:
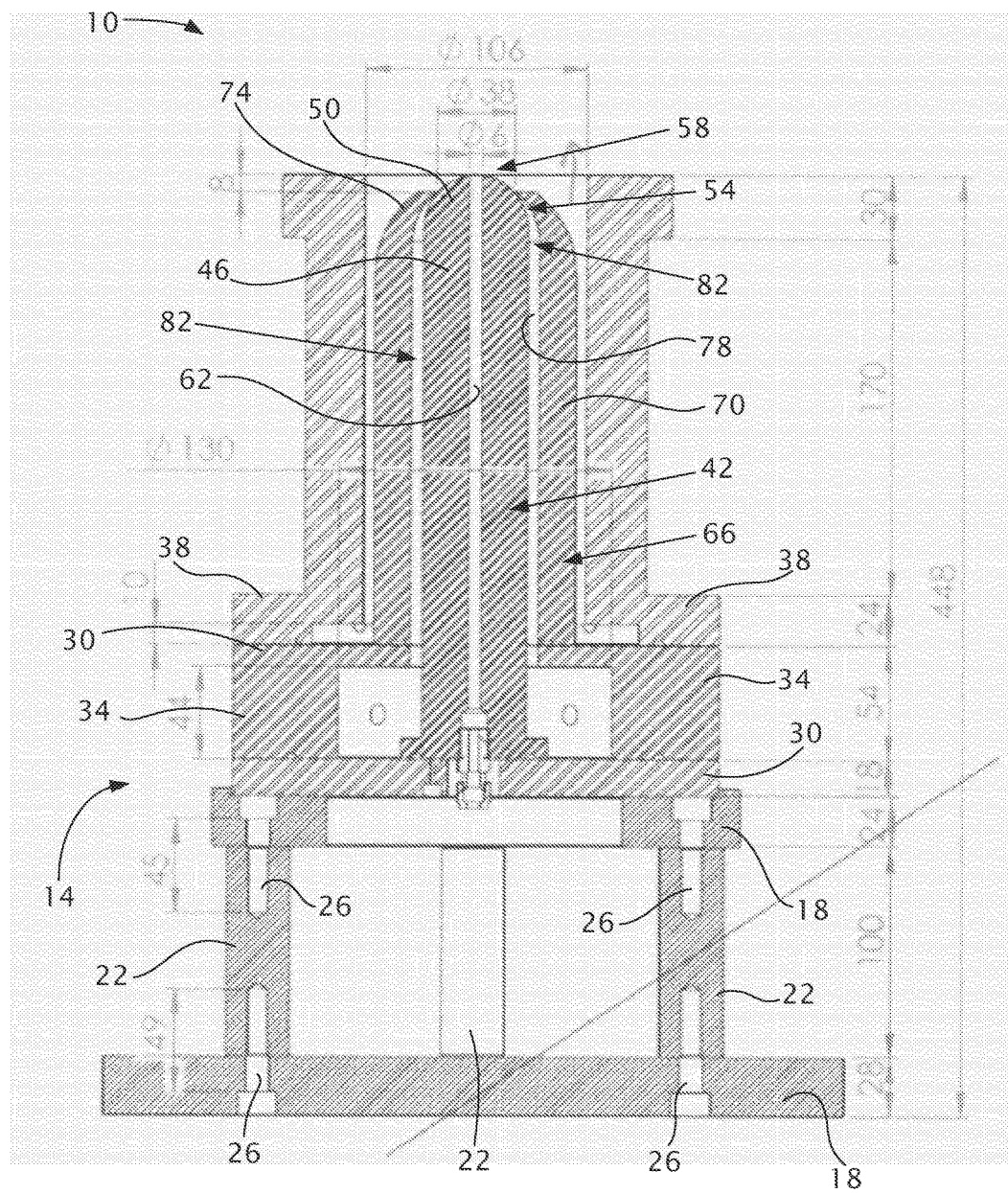
FIG. 1 depicts an embodiment of a combustion apparatus comprising a base, a center member having a bore, and an outer member positioned such that a channel is defined between the outer member and the center member. The combustion apparatus of FIG. 1 and its components are drawn to scale. The dimensions depicted in FIG. 1 are non-limiting examples of possible dimensions for a combustion apparatus.

Referring now to the drawings, and more particularly to FIG. 1, there is shown combustion apparatus 10 comprising base 14. Base 14 can comprise any number of members configured to, for example, stabilize combustion apparatus 10, provide fluid to combustion apparatus 10, and the like. For example, in the embodiment shown in FIG. 1, base 14 comprises lower latitudinal members 18 coupled to lower longitudinal members 22. In the embodiment shown, lower latitudinal members 18 are coupled to lower longitudinal members 22 by screws 26; however, in other embodiments, lower latitudinal members 18 can be coupled to lower longitudinal members 22 in any suitable way (e.g., bolts, nails, adhesives, welds, and the like). In still other embodiments, lower latitudinal members 18 and lower longitudinal members 22 can be integral (e.g., formed of the same piece of material). In the embodiment shown in FIG. 1, base 14 further comprises middle latitudinal members 30 coupled to middle longitudinal members 34. As above, middle latitudinal members 30 can be coupled to (e.g., with screws, bolts, nails, adhesives, welds, and the like) or integral with middle longitudinal members 34. Similarly, middle latitudinal members 30 and/or middle longitudinal members 34 can be coupled to (e.g., with screws, bolts, nails, adhesives, welds, and the like) or integral with lower latitudinal members 18 and/or lower longitudinal members 22. Further, in the embodiment shown in FIG. 1, apparatus 10 comprises upper members 38 disposed above base 14 and coupled to middle latitudinal member 30 of base 14. As above, upper members 38 can be coupled to (e.g., with screws, bolts, nails, adhesives, welds, and the like) or integral with base 14 (e.g., middle latitudinal member 30, in the embodiment shown).

In the embodiment shown, combustion apparatus 10 further comprises center member 42 having a longitudinal axis. Center member 42 includes body 46 coupled to base 14 (e.g., middle latitudinal member 30). In the embodiment shown, at least a portion of body 46 of center member 42 is substantially cylindrical. Center member 42 also includes tip 50, which is integral with body 46. In the embodiment shown, at least a portion of tip 50 of center member 42 is substantially hemispherical (e.g., with a radius of, for example, 25 millimeters). Tip 50 comprises first end 54, which is proximal to base 14 and integral with body 46, and second end 58, which is distal to base 14. In some embodiments, center member 42 comprises a diameter of 30 to 45 millimeters; and in other embodiments, a diameter of center member 42 can be less than 30 millimeters (e.g., 25, 20, 15 millimeters or less) or greater than 45 millimeters (e.g., 50, 55, 60 millimeters or more). In the embodiment shown, center member 42 further comprises bore 62, which is concentric with the longitudinal axis of center member 42. Bore 62 extends through body 54 and tip 50. Apparatus 10 is configured to permit fluid to move through bore 62 of center member 42 (e.g., through body 54 and tip 50) and out of tip 50 of center member 42. In some embodiments, bore 62 of center member 42 comprises a diameter of 2 to 10 millimeters (e.g., 6 millimeters); and in other embodiments, a diameter of bore 62 can be less than 2 millimeters (1.5, 1, 0.5 millimeters, or less) or greater than 10 millimeters (12, 14, 16 millimeters, or more).

In the embodiment shown, combustion apparatus 10 further comprises outer member 66. Outer member 66 includes body 70 coupled to base 14 (e.g., middle latitudinal member 30). In the embodiment shown, at least a portion of body 70 of outer member 66 is substantially cylindrical. Outer member 66 also includes tip 74, which is integral with body 70. In the embodiment shown, at least a portion of tip 74 of outer member 66 is substantially curved. In the embodiment shown, at least a portion of tip 50 of center member 42 is farther from base 14 than tip 74 of outer member 66. For example, as depicted in FIG. 1, second end 58 of tip 50 of center member 42 is approximately 8 millimeters farther from base 14 than tip 74 of outer member 66. As will be discussed, center member 42 and outer member 66 can be adjustable, and tip 50 can be greater than 8 millimeters farther from base 14 than tip 74 (e.g., 10, 12, 14 millimeters, or more) or less than 8 millimeters farther from base 14 than tip 74 (e.g., 6, 4, 2 millimeters, or less). In some embodiments, outer member 66 comprises a diameter of 35 to 100 millimeters; and in other embodiments, a diameter of outer member 66 can be less than 30 millimeters (e.g., 25, 20, 15 millimeters, or less) or more than 100 millimeters (e.g., 105, 110, 115 millimeters, or more). In the embodiment shown, outer member 66 further comprises bore 78, which is concentric with the longitudinal axis of center member 42. Bore 78 extends through body 70 and tip 74. Furthermore, outer member 66 is positioned such that channel 82 (a portion of bore 78) is defined between outer member 66 and center member 42. Apparatus 10 is configured to permit fluid to move through channel 82 (e.g., in the embodiment shown, between body 54 and body 70 and also between at least a portion of tip 50 and at least a portion of tip 74) and out of tip 74 of outer member 66. In some embodiments, bore 78 of outer member 66 comprises a diameter of 30 to 50 millimeters (e.g., 38 millimeters at tip 74); and in other embodiments, a diameter of bore 78 can be less than 30 millimeters (e.g., 25, 20, 15 millimeters, or less) or greater than 50 millimeters (e.g., 55, 60, 65 millimeters, or more).

Figure 2:
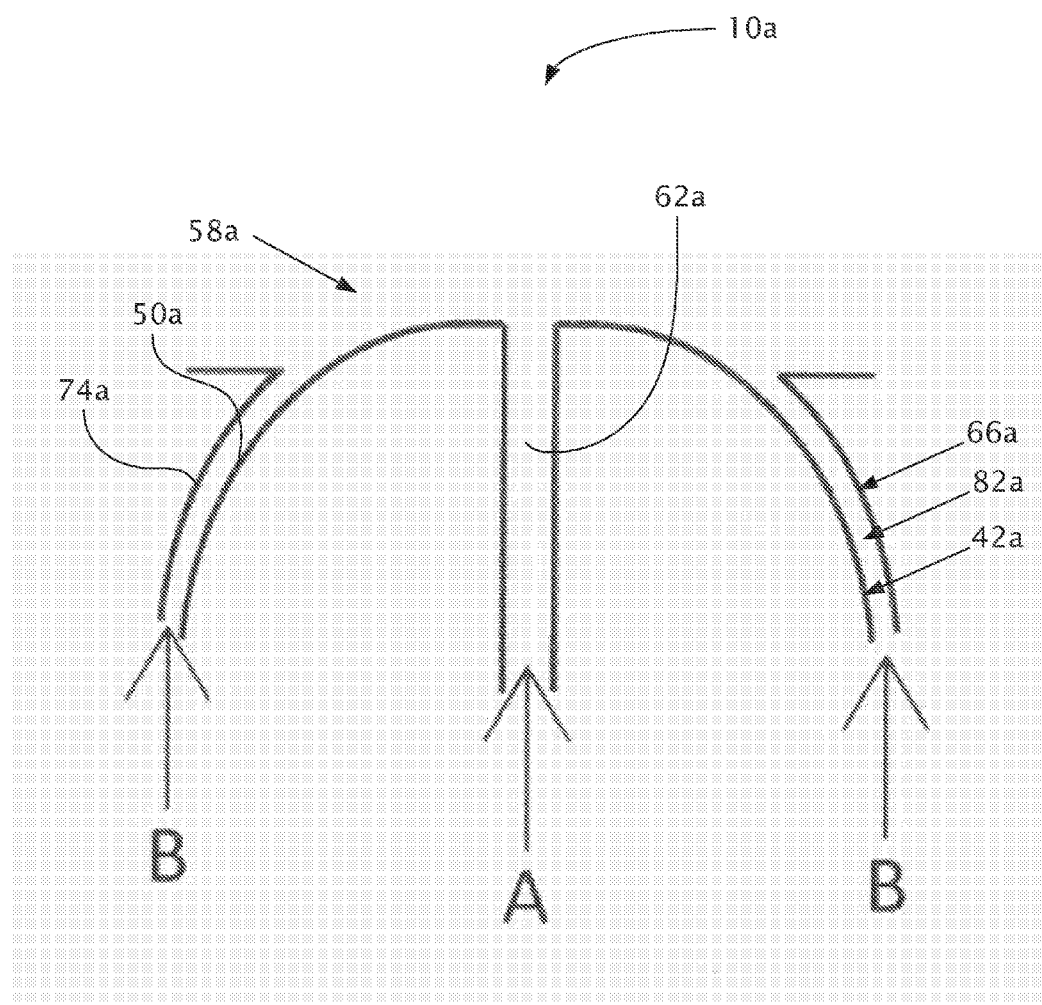
FIG. 2 depicts an embodiment of a portion of a combustion apparatus comprising a center member having a bore and further comprising an outer member positioned such that a channel is defined between the outer member and the center member.

FIG. 2 depicts an embodiment 10*a* of the present combustion apparatuses comprising center member 42*a* having bore 62*a* and further comprising outer member 66*a* positioned such that channel 82*a* is defined between outer member 62*a* and center member 42*a*. Apparatus 10*a* is configured to permit fluid to move through bore 62*a* of center member 42*a* and out of tip 50*a* of center member 42*a*. Apparatus 10*a* is further configured to permit fluid to move through channel 82*a* and out of tip 74*a* of outer member 66*a*. For example, in the embodiment shown, Fluid A can move through bore 62*a* of center member 42*a* and out of tip 50*a*, and Fluid B can move through channel 82*a* and out of tip 74*a* of outer member 66*a* such that Fluid A and Fluid B can mix and, if ignited, combust.

Figure 3:
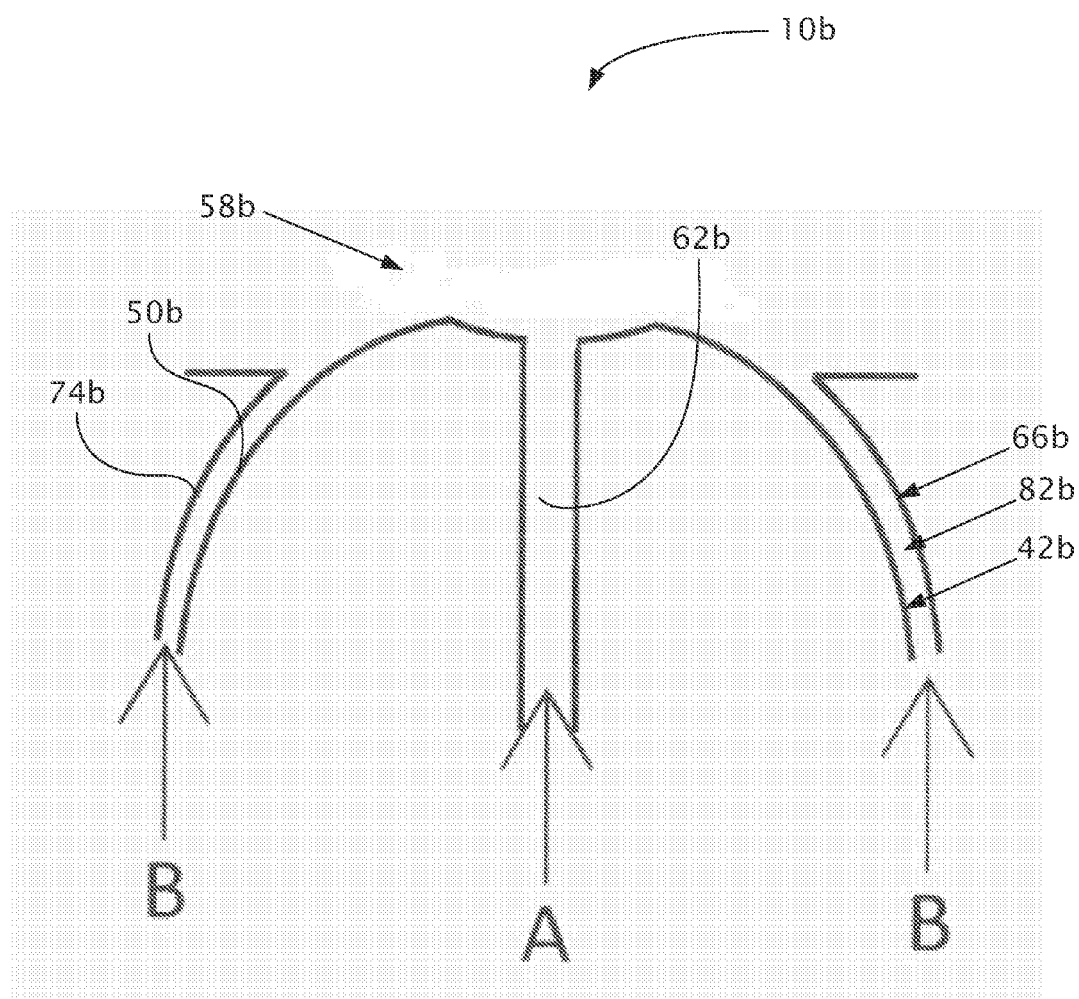
FIG. 3 depicts another embodiment of a portion of a combustion apparatus comprising a center member having a bore and further comprising an outer member positioned such that a channel is defined between the outer member and the center member, where the tip of the center member has a first end and a second end, and the second end of the tip is substantially concave.

FIG. 3 depicts an embodiment 10*b* of the present combustion apparatuses comprising center member 42*b* having bore 62*b* and further comprising outer member 66*b* positioned such that channel 82*b* is defined between outer member 62*b* and center member 42*b*. In the embodiment shown, second end 58*b* of tip 50*b* is substantially concave. For example, second end 58*b* of tip 50*b* can comprise a radii of curvature of 10 to 40 millimeters (e.g., 25 millimeters). Apparatus 10*b* is configured to permit fluid to move through bore 62*b* of center member 42*b* and out of tip 50*b* of center member 42*b*. Apparatus 10*b* is further configured to permit fluid to move through channel 82*b* and out of tip 74*b* of outer member 66*a*. For example, in the embodiment shown, Fluid A can move through bore 62*b* of center member 42*b* and out of tip 50*b*, and Fluid B can move through channel 82*b* and out of tip 74*b* of outer member 66*b* such that Fluid A and Fluid B can mix and, if ignited, combust. The concave configuration of second end 58*b* of tip 50*b* can increase flame stability by encouraging recirculation of fluid (e.g., Fluid A and Fluid B), in part due to a greater amount of space for recirculation near second end 58*b* of tip 50*b*.

Figure 4:
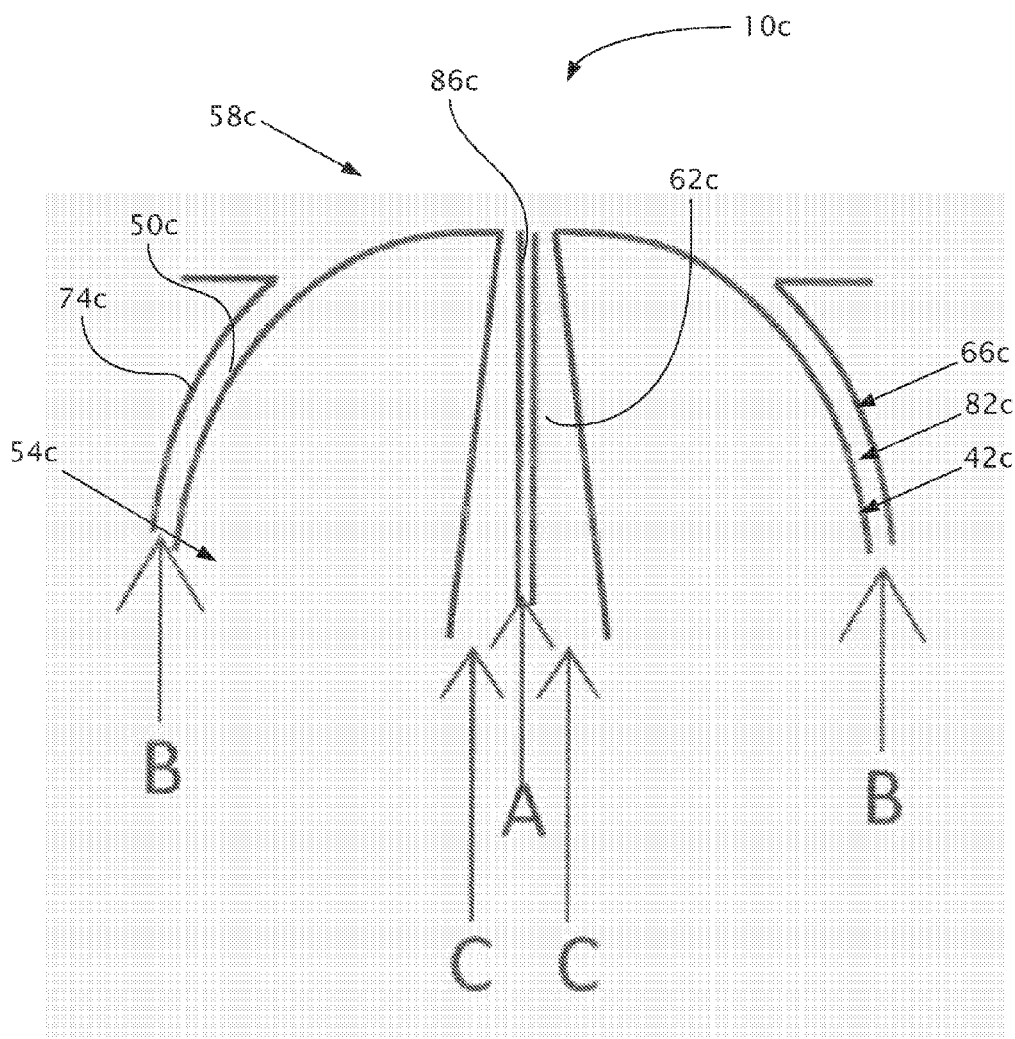
FIG. 4 depicts another embodiment of a portion of a combustion apparatus comprising a center member having a bore and a spray injector disposed in the bore and further comprising an outer member positioned such that a channel is defined between the outer member and the center member.

FIG. 4 depicts an embodiment 10*c* of the present combustion apparatuses comprising center member 42*c* having bore 62*c* and further comprising outer member 66*c* positioned such that channel 82*c* is defined between outer member 62*c* and center member 42*c*. In the embodiment shown, at least a portion of bore 62*c* of center member 42*c* does not have a constant diameter (e.g., the diameter of bore 62*c* decreases (e.g., at a constant rate) from first end 54*c* to second end 58*c* of tip 50*c*). Apparatus 10*c* is configured to permit fluid to move through bore 62*c* of center member 42*c* and out of tip 50*c* of center member 42*c*. Apparatus 10*c* is further configured to permit fluid to move through channel 82*c* and out of tip 74*c* of outer member 66*c*. For example, in the embodiment shown, Fluid A can move through bore 62c of center member 42c and out of tip 50c, and Fluid B can move through channel 82c and out of tip 74c of outer member 66c such that Fluid A and Fluid B can mix and, if ignited, combust. Apparatus 10c further comprises spray injector 86c disposed in bore 62c of center member 42c such that when fluid (e.g., Fluid A) moves through bore 62c of center member 42c, spray injector 86c assists in atomizing the fluid. In one embodiment, embodiment 10c comprises a separate slot/opening for spray injector 86c. For example, Fluid A (e.g., liquid) and Fluid C (e.g., dispersion gas) can move through bore 62c of center member 42c toward spray injector 86c, and spray injector 86c and Fluid C can atomize Fluid A. Atomizing a fluid (e.g., Fluid A) can, for example, after mixing with another fluid (e.g., Fluid B) and combustion, lead to nanoparticle formation.

Figure 5:
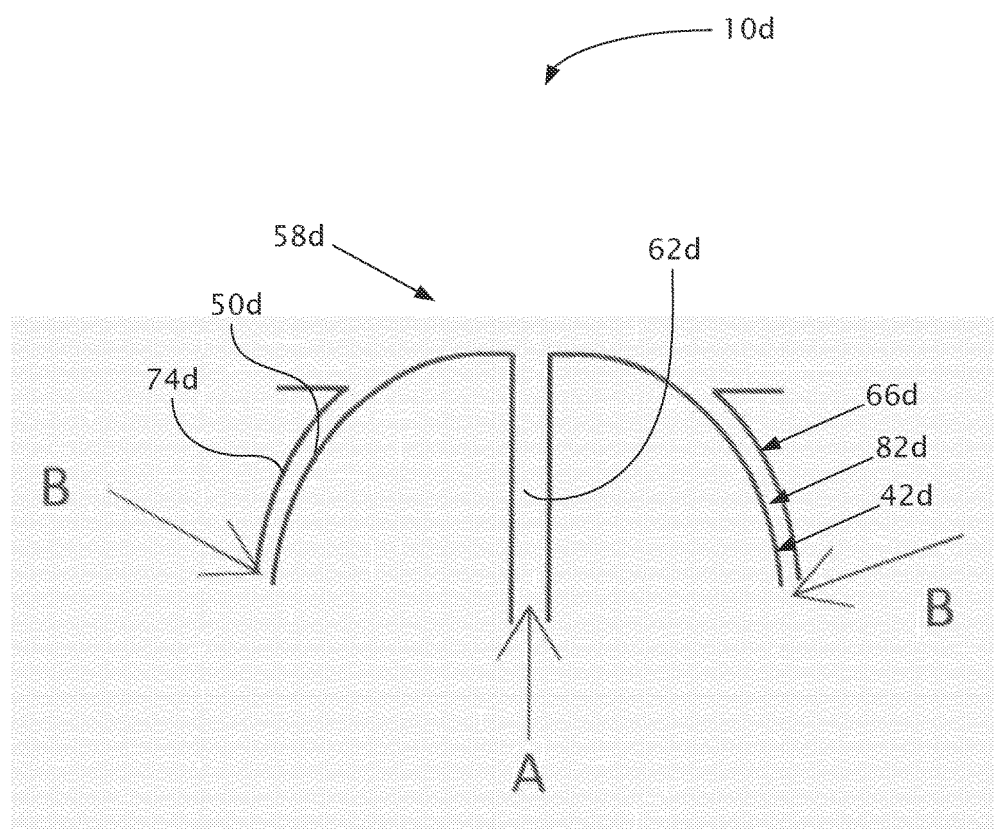
FIG. 5 depicts another embodiment of a portion of a combustion apparatus comprising a center member having a bore and further comprising an outer member positioned such that a channel is defined between the outer member and the center member, where fluid can be introduced into the channel substantially perpendicular to the channel.

FIG. 5 depicts an embodiment 10d of the present combustion apparatuses comprising center member 42d having bore 62d and further comprising outer member 66d positioned such that channel 82d is defined between outer member 62d and center member 42d. Apparatus 10d is configured to permit fluid to move through bore 62d of center member 42d and out of tip 50d of center member 42d. Apparatus 10d is further configured to permit fluid to move through channel 82d and out of tip 74d of outer member 66d. For example, in the embodiment shown, Fluid A can move through bore 62d of center member 42d and out of tip 50d, and Fluid B can move through channel 82d and out of tip 74d of outer member 66d such that Fluid A and Fluid B can mix and, if ignited, combust. In the embodiment shown in FIG. 5, outer member 66d is configured such that fluid can be introduced into channel 82d substantially perpendicular to channel 82d such that, for example, the flow through channel 82d has a velocity component tangent to tip 74d. Such a configuration can encourage a swirling flow, which, for example, can encourage mixing of fluid (e.g., Fluid A and Fluid B near second end 58d of tip 50d).

Figure 6:
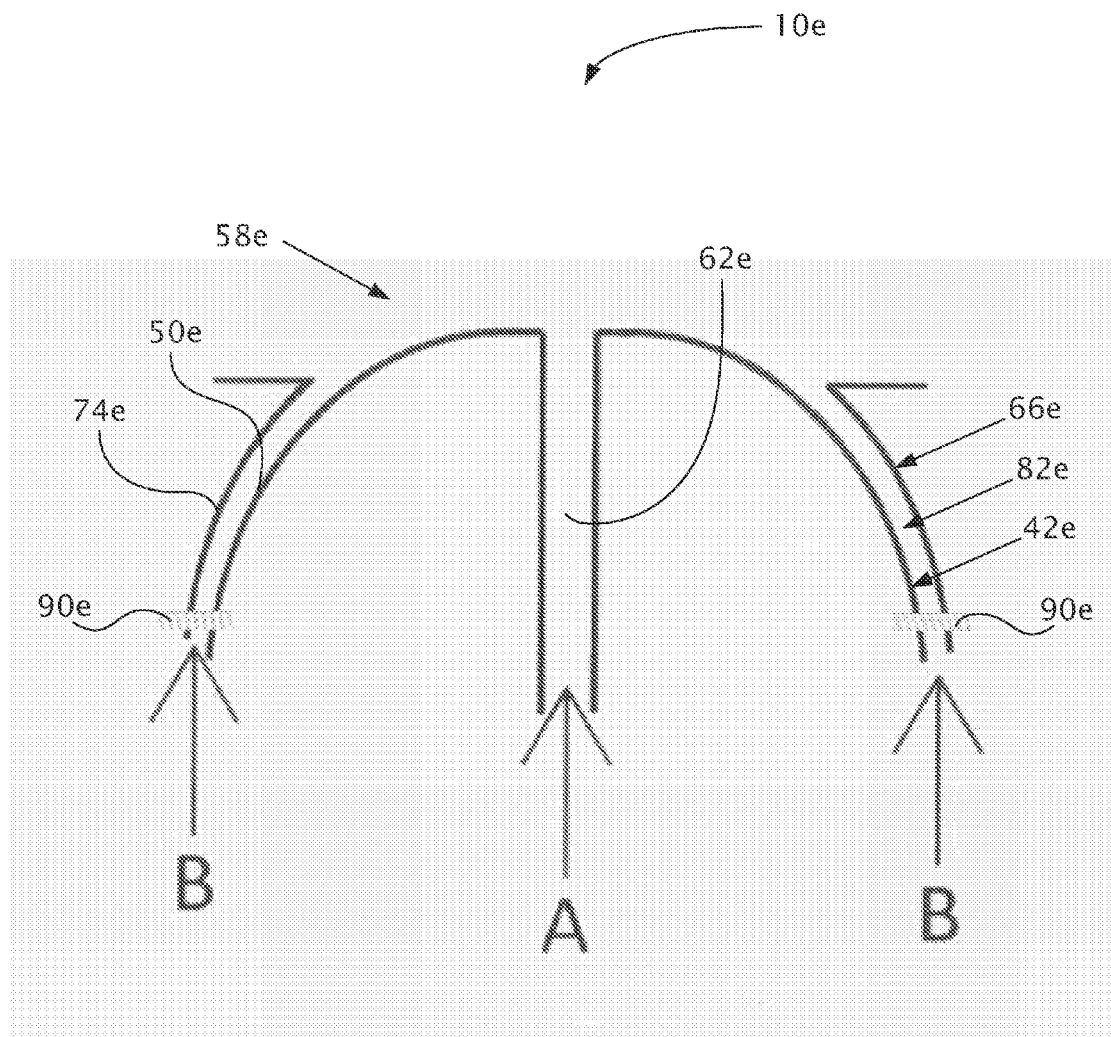
FIG. 6 depicts another embodiment of a portion of a combustion apparatus comprising a center member having a bore, an outer member positioned such that a channel is defined between the outer member and the center member, and a swirling vane disposed in the bore of the center member.

FIG. 6 depicts an embodiment 10e of the present combustion apparatuses comprising center member 42e having bore 62e and further comprising outer member 66e positioned such that channel 82e is defined between outer member 62e and center member 42e. Apparatus 10e is configured to permit fluid to move through bore 62e of center member 42e and out of tip 50e of center member 42e. Apparatus 10e is further configured to permit fluid to move through channel 82e and out of tip 74e of outer member 66e. For example, in the embodiment shown, Fluid A can move through bore 62e of center member 42e and out of tip 50e, and Fluid B can move through channel 82e and out of tip 74e of outer member 66e such that Fluid A and Fluid B can mix and, if ignited, combust. In the embodiment shown in FIG. 6, apparatus 10e further comprises swirling vanes 90e each of which can be inserted into channel 82e, for example, near tip 74e and each of which can be disposed in channel 82e such that fluid (e.g., Fluid B) moving through channel 82e is disturbed. Such a configuration can encourage a swirling flow, which, for example, can encourage mixing of fluid (e.g., Fluid A and Fluid B near second end 58e of tip 50e).

Figure 7:
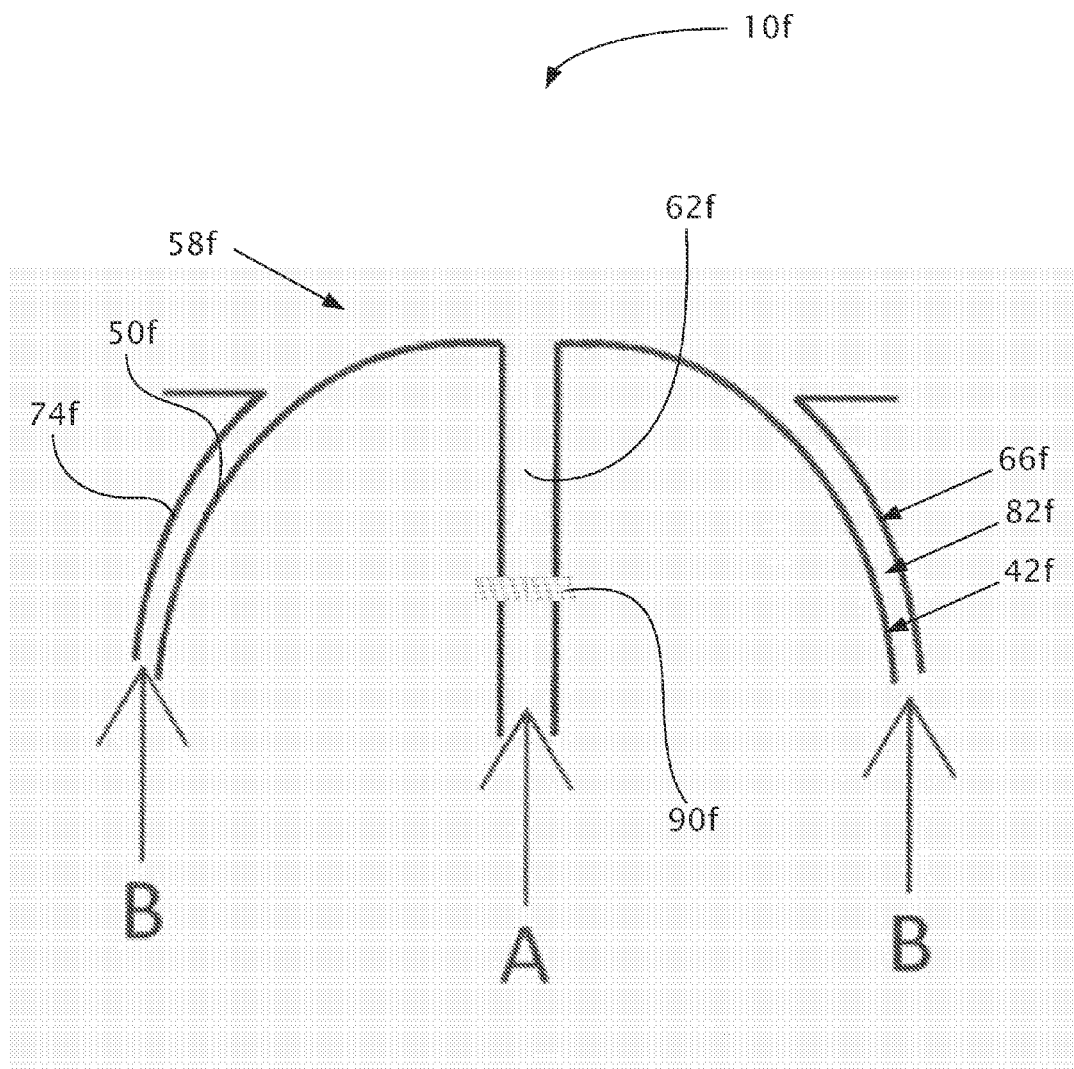
FIG. 7 depicts another embodiment of a portion of a combustion apparatus comprising a center member having a bore, an outer member positioned such that a channel is defined between the outer member and the center member, and swirling vanes disposed in the channel.

FIG. 7 depicts an embodiment 10f of the present combustion apparatuses comprising center member 42f having bore 62f and further comprising outer member 66f positioned such that channel 82f is defined between outer member 62f and center member 42f Apparatus 10f is configured to permit fluid to move through bore 62f of center member 42f and out of tip 50f of center member 42f Apparatus 10f is further configured to permit fluid to move through channel 82f and out of tip 74f of outer member 66f.

For example, in the embodiment shown, Fluid A can move through bore 62f of center member 42f and out of tip 50f, and Fluid B can move through channel 82f and out of tip 74f of outer member 66f such that Fluid A and Fluid B can mix and, if ignited, combust. In the embodiment shown in FIG. 7, apparatus 10f further comprises swirling vane 90f disposed in bore 62f of center member 42f such that fluid (e.g., Fluid A) moving through bore 62f of center member 42f is disturbed. Such a configuration can encourage a swirling flow, which, for example, can encourage mixing of fluid (e.g., Fluid A and Fluid B near second end 58f of tip 50f).

Figure 8:
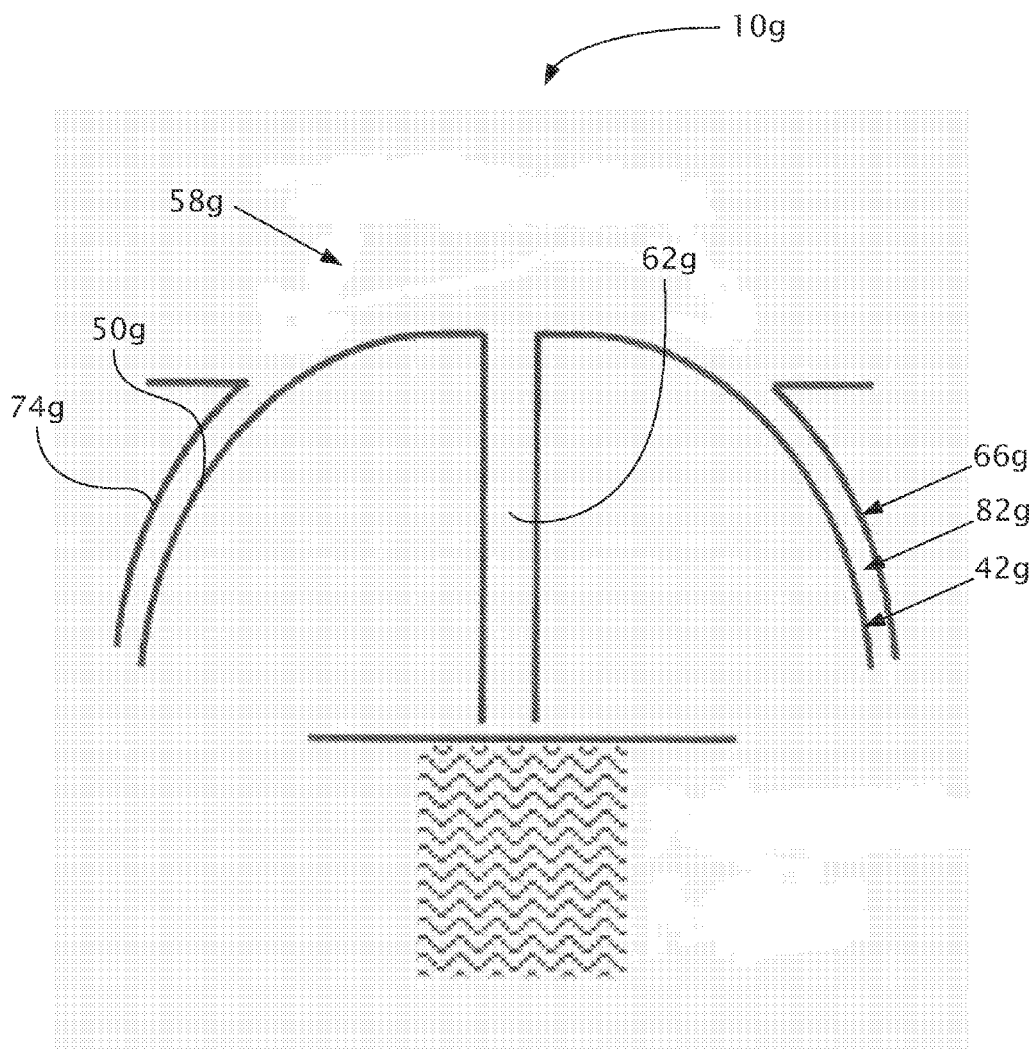
FIG. 8 depicts another embodiment of a portion of a combustion apparatus comprising a center member having a bore and further comprising an outer member positioned such that a channel is defined between the outer member and the center member, where the outer member and/or the center member are adjustable such that at least a portion of the channel can change in width.

FIG. 8 depicts an embodiment 10g of the present combustion apparatuses comprising center member 42g having bore 62g and further comprising outer member 66g positioned such that channel 82g is defined between outer member 62g and center member 42g. Apparatus 10g is configured to permit fluid to move through bore 62g of center member 42g and out of tip 50g of center member 42g. Apparatus 10g is further configured to permit fluid to move through channel 82g and out of tip 74g of outer member 66g. For example, in the embodiment shown, Fluid A can move through bore 62g of center member 42g and out of tip 50g, and Fluid B can move through channel 82g and out of tip 74g of outer member 66g such that Fluid A and Fluid B can mix and, if ignited, combust. In the embodiment shown in FIG. 8, center member 42g and/or outer member 66g is adjustable (e.g., along the longitudinal axis of center member 42g) with respect to the other (or with respect to a base, an example of which is described with respect to FIG. 1) such that at least a portion of channel 82g (e.g., the portion of channel 82g near tip 50g and tip 74g) changes in width. For example, if center member 42g is adjustable and outer member 66g is fixed, center member 42g can be adjusted (e.g., longitudinally) such that at least a portion of channel 82g decreases in width. As another example, if center member 42g is fixed and outer member 66g is adjustable, outer member 66g can be adjusted (e.g., longitudinally) such that at least a portion of channel 82g increases in width. In some embodiments, both center member 42g and outer member 66g are adjustable. Center member 42g and/or outer member 66g can be adjusted such that a desired width of channel 82g (e.g., the portion of channel 82g near tip 50g and tip 74g) is obtained, such as, for example, a width of 0.1 millimeters to 0.15 millimeters. An adjustable center member (e.g., center member 42g) and/or an adjustable outer member (e.g., outer member 66g) can, for example, increase control of flame velocity and flame stability.

A variety of fluids can be used with the present apparatuses for combustion and/or material synthesis. For example, a precursor can be introduced through a bore of a center member (e.g., bore 62 of center member 42) and a pre-mixture (e.g., fuel and oxidizer) can be introduced through a channel between the center member and an outer member (e.g., channel 82 between center member 42 and outer member 66). The precursor and pre-mixture can mix, and, if ignited, combust, forming material(s) (e.g., nanoparticles (e.g., carbon black, fumed $SiO_2$, $TiO_2$, and the like)) depending on, for example, the type of precursor, the type of pre-mixture, the width of the channel, the fluid loading rate, the fuel-to-oxidizer ratio, and the temperature, among other things. As another example, fuel can be introduced through a bore of a center member (e.g., bore 62 of center member 42) and oxidizer can be introduced through a channel between the center member and an outer member (e.g., channel 82 between center member 42 and outer member 66). The fuel and the oxidizer can mix, and, if ignited, combust. As an example, in some embodiments, the fuel can comprise ethylene and the oxidizer can comprise air, with an equivalence ratio from 0.8 to 1.6. In some embodiments, the precursor can comprise titanium tetraisopropoxide (TTIP), for example, to produce titanium dioxide nanoparticles. In some embodiments, the precursor can comprise hexamethyldisiloxane (HMDSO), for example, to produce silicon dioxide nanoparticles. In some embodiments, other nanoparticles and metal-oxides can be produced based on the selected fuel, oxidizer, and/or precursor, such as aluminum oxide, cerium oxide, iron oxide, zinc oxide, and/or zirconium oxide.

Some embodiments of the present methods comprise introducing a first fluid into a bore (e.g., bore 62) of a center member (e.g., center member 42) that has a longitudinal axis, the center member comprising: a body (e.g., body 46) coupled to a base (e.g., base 14), where at least a portion of the body is substantially cylindrical, and a tip (e.g., tip 50) integral with the body, where at least a portion of the tip is substantially hemispherical, and where the bore of the center member is concentric with the longitudinal axis of the center member and extends through the body and the tip; introducing a second fluid into a channel (e.g., channel 82) defined by the center member and an outer member (e.g., outer member 66), the outer member comprising: a body (e.g., body 70) coupled to the base and a tip (e.g., tip 74) integral with the body, where at least a portion of the tip of the center member is farther from the base than the tip of the outer member; permitting the second fluid to flow over the tip of the center member and to mix with the first fluid; and igniting the mixture of the first fluid and the second fluid. In some embodiments, the first fluid is a precursor and the second fluid is a mixture of fuel and oxidizer. In some embodiments, the precursor comprises a metal nitrate dissolved in solvent. In some embodiments, the first fluid is fuel and the second fluid is oxidizer. In some embodiments, a spray injector (e.g., spray injector 86c) is disposed in the bore of the center member, and the method further comprises atomizing the first fluid. In some embodiments, the first fluid is a liquid. In some embodiments, the method comprises introducing dispersion gas into the bore of the center member such that the second fluid is atomized. In some embodiments, the method comprises introducing the second fluid into the channel substantially perpendicular to the channel. In some embodiments, the method comprises adjusting the center member with respect to the outer member such that at least a portion of the channel between the tip of the outer member and the tip of the center member changes in width; and in other embodiments, the method comprises adjusting the outer member with respect to the center member such that at least a portion of the channel between the tip of the outer member and the tip of the center member changes in width.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present apparatuses and methods are not intended to be limited to the particular forms disclosed. Rather, they include all modifications and alternatives falling within the scope of the claims, and embodiments other than the ones shown may include some or all of the features of the depicted embodiments. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A combustion apparatus comprising:
a base;
a center member having a longitudinal axis and comprising:
a body coupled to the base, where at least a portion of the body is substantially cylindrical;
a tip integral with the body, where at least a portion of the tip is substantially hemispherical; and
a bore concentric with the longitudinal axis of the center member, the bore extending through the body and the tip; and
an outer member comprising:
a body coupled to the base;
a tip integral with the body, where at least a portion of the tip of the center member is farther from the base than the tip of the outer member and the at least a portion of the tip of the outer member is curved toward the tip of the center member; and
a bore concentric with the longitudinal axis of the center member;
where the outer member is positioned such that a channel is defined between the outer member and the center member; and
where the apparatus is configured to:
permit a first fluid to move through the bore of the center member and out of the tip of the center member; and
permit a second fluid to move through the channel and out of the tip of the outer member, and permit the second fluid to flow over the tip of the center member due to the curved tip of the outer member.

2. The apparatus of claim 1, where the bore of the center member comprises a diameter of 2 to 10 millimeters.

3. The apparatus of claim 1, where the bore of the outer member comprises a diameter of 30 to 50 millimeters.

4. The apparatus of claim 1, where the outer member comprises a diameter of 30 to 100 millimeters.

5. The apparatus of claim 1, where the tip of the center member has a first end and a second end, and the second end of the tip is substantially concave.

6. The apparatus of claim 1, further comprising:
a spray injector disposed in the bore of the center member such that when fluid moves through the bore of the center member, the spray injector assists in atomizing the fluid.

7. The apparatus of claim 1, where the outer member is configured such that fluid can be introduced into the channel substantially perpendicular to the channel.

8. The apparatus of claim 1, further comprising:
a swirling vane disposed in the bore of the center member such that fluid moving through the bore of the center member is disturbed.

9. The apparatus of claim 1, further comprising:
a swirling vane disposed in the channel such that fluid moving through the channel is disturbed.

10. The apparatus of claim 1, where the center member is adjustable with respect to the outer member such that at least a portion of the channel can change in width.

11. The apparatus of claim 1, where the outer member is adjustable with respect to the center member such that at least a portion of the channel can change in width.

12. A combustion method comprising:
introducing a first fluid into a bore of a center member that has a longitudinal axis, the center member comprising:
a body coupled to a base, where at least a portion of the body is substantially cylindrical; and
a tip integral with the body, where at least a portion of the tip is substantially hemispherical;
where the bore of the center member is concentric with the longitudinal axis of the center member and extends through the body and the tip;
introducing a second fluid into a channel defined by the center member and an outer member, the outer member comprising:
a body coupled to the base; and
a tip integral with the body, where at least a portion of the tip of the center member is farther from the base than the tip of the outer member and the at least a portion of the tip of the outer member is curved toward the tip of the center member;
permitting the second fluid to flow over the tip of the center member due to the curved tip of the outer member and to mix with the first fluid; and
igniting the mixture of the first fluid and the second fluid.

13. The method of claim 12, where the first fluid is a precursor and the second fluid is a mixture of fuel and oxidizer.

14. The method of claim 13, where the precursor comprises a metal nitrate dissolved in solvent.

15. The method of claim 12, where the first fluid is fuel and the second fluid is oxidizer.

16. The method of claim 12, where a spray injector is disposed in the bore of the center member, the method further comprising:
atomizing the first fluid.

17. The method of claim 12, further comprising:
introducing dispersion gas into the bore of the center member such that the second fluid is atomized.

18. The method of claim 12, further comprising:
introducing the second fluid into the channel substantially perpendicular to the channel.

19. The method of claim 12, further comprising:
adjusting the center member with respect to the outer member such that at least a portion of the channel between the tip of the outer member and the tip of the center member changes in width.

20. The method of claim 12, further comprising:
adjusting the outer member with respect to the center member such that at least a portion of the channel between the tip of the outer member and the tip of the center member changes in width.

* * * * *